United States Patent
Horii et al.

(10) Patent No.: US 12,305,062 B2
(45) Date of Patent: May 20, 2025

(54) CLEAR COATING COMPOSITION AND METHOD FOR PRODUCING COATED ARTICLE

(71) Applicant: NIPPON PAINT AUTOMOTIVE COATINGS CO., LTD., Osaka (JP)

(72) Inventors: Takeshi Horii, Hirakata (JP); Hiroyuki Komaki, Hirakata (JP); Koji Matsumoto, Hirakata (JP); Shotaro Kajihara, Hirakata (JP)

(73) Assignee: NIPPON PAINT AUTOMOTIVE COATINGS CO., LTD., Osaka (JP)

( * ) Notice: Subject to any disclaimer, the term of this patent is extended or adjusted under 35 U.S.C. 154(b) by 0 days.

(21) Appl. No.: 18/722,355

(22) PCT Filed: Jul. 10, 2023

(86) PCT No.: PCT/JP2023/025429
§ 371 (c)(1),
(2) Date: Jun. 20, 2024

(87) PCT Pub. No.: WO2024/134943
PCT Pub. Date: Jun. 27, 2024

(65) Prior Publication Data
US 2025/0109313 A1    Apr. 3, 2025

(30) Foreign Application Priority Data
Dec. 23, 2022  (JP) .................. 2022-206529

(51) Int. Cl.
C09D 133/14    (2006.01)
C09D 7/63    (2018.01)
C09D 133/06    (2006.01)

(52) U.S. Cl.
CPC ........... C09D 133/066 (2013.01); C09D 7/63 (2018.01); C09D 133/14 (2013.01)

(58) Field of Classification Search
CPC ..... C09D 133/066; C09D 133/14; C09D 7/63
USPC ....................................... 524/197
See application file for complete search history.

(56) References Cited

U.S. PATENT DOCUMENTS

| | | |
|---|---|---|
| 5,576,063 A | 11/1996 | Briggs et al. |
| 2007/0258940 A1 | 11/2007 | Hamilton et al. |
| 2023/0392035 A1* | 12/2023 | Furuya .............. C08F 220/1804 |
| 2023/0407129 A1* | 12/2023 | Furuya .............. C08G 18/4063 |
| 2024/0018385 A1 | 1/2024 | Watanabe |

FOREIGN PATENT DOCUMENTS

| | | |
|---|---|---|
| JP | 9-3399 | 1/1997 |
| JP | 2009-535214 | 10/2009 |
| JP | 2015-196762 | 11/2015 |
| JP | 2017-165812 | 9/2017 |
| JP | 2018-134606 | 8/2018 |
| JP | 7071607 | 5/2022 |
| JP | 2022-135423 | 9/2022 |
| WO | 2007-126623 | 5/2007 |
| WO | 2022/107847 | 5/2022 |
| WO | 2022/107848 | 5/2022 |
| WO | 2022/186049 | 9/2022 |

OTHER PUBLICATIONS

Non-Patent document in Japanese (Internet archive (Wayback machine)) https://web.archive.org/web/20191215083819/https://www.sankyochem.com/product/glycol-ester/diethyleneglycol-monoetyl-ether-acetate.
Non-Patent document in Japanese (Internet archive (Wayback machine)) https://web.archive.org/web/20191215031551/https://www.sankyochem.com/product/glycol-ester/diethyleneglycol-monobutyl-ether-acetate/.
International Search Report issued Aug. 22, 2023 in International (PCT) Application No. PCT/JP2023/025429.
Notice of Reasons for Refusal issued Nov. 21, 2023, in corresponding Japanese Patent Application No. 2022-206529, with English machine translation.
Written Opinion of the International Searching Authority issued Aug. 22, 2023 in International (PCT) Application No. PCT/JP2023/025429.

* cited by examiner

*Primary Examiner* — Kelechi C Egwim
(74) *Attorney, Agent, or Firm* — Wenderoth, Lind & Ponack, L.L.P.

(57) ABSTRACT

Provided is a clear coating composition which affords a coating film having superior resistance to color shift and is superior in coating workability while having a high solid content. A clear coating composition including a hydroxy group-containing acrylic resin (A), a polyisocyanate compound (B), and an organic solvent (C), wherein the hydroxy group-containing acrylic resin (A) includes a primary hydroxy group-containing acrylic resin (A1) and a secondary hydroxy group-containing acrylic resin (A2), the primary hydroxy group-containing acrylic resin (A1) has a weight average molecular weight of 6000 or less, the secondary hydroxy group-containing acrylic resin (A2) has a weight average molecular weight of 6000 or more, the organic solvent (C) includes a specific primary alcohol and/or secondary alcohol, and the clear coating composition has a solid concentration of 55% by mass or more at a time of coating.

11 Claims, No Drawings

CLEAR COATING COMPOSITION AND METHOD FOR PRODUCING COATED ARTICLE

TECHNICAL FIELD

The present invention relates to a clear coating composition and a method for producing a coated article.

BACKGROUND ART

A clear coating film is usually formed as an outermost layer of a vehicle body of an automobile or the like. Clear coating films are required to have high designability and appearance.

Meanwhile, in recent years, reduction of emission of volatile organic compounds (VOC) from factories and the like has been required for environmental conservation. One of the techniques for reducing VOC emission is to increase the solid concentration of a coating composition.

Patent Document 1 describes a coating composition comprising (A) a hydroxy group-containing acrylic resin having an acid value of 0 to 30 mg KOH/g, (B) a hydroxy group-containing acrylic resin having an acid value of 60 to 120 mg KOH/g, and (C) a polyisocyanate compound, and having a solid content at the time of application of 50% by mass or more.

PRIOR ART DOCUMENT

Patent Document

Patent Document 1: WO 2022/107847 A1

SUMMARY OF THE INVENTION

Problems to be Solved by the Invention

According to Patent Document 1, a high solid content coating composition with reduced emission of VOC and a coating film superior in resistance to color shift and in appearance are obtained. However, as consumers are increasingly demanding higher designability and appearance due to their higher-grade intention, it is still insufficient to achieve both of these performances and coating workability.

An object of the present invention is to provide a clear coating composition which affords a coating film having superior resistance to color shift and is superior in coating workability while having a high solid content, and a method for producing a coated article using the clear coating composition.

Solutions to the Problems

In order to solve the above-described problems, the present invention provides the following aspects.

[1]
A clear coating composition comprising:
a hydroxy group-containing acrylic resin (A);
a polyisocyanate compound (B); and
an organic solvent (C),
wherein
the hydroxy group-containing acrylic resin (A) includes a primary hydroxy group-containing acrylic resin (A1) and a secondary hydroxy group-containing acrylic resin (A2),
the primary hydroxy group-containing acrylic resin (A1) has a weight average molecular weight of 6,000 or less,
the secondary hydroxy group-containing acrylic resin (A2) has a weight average molecular weight of 6,000 or more,
the organic solvent (C) includes at least one alcohol solvent selected from the group consisting of linear primary alcohols having 1 to 8 carbon atoms, branched primary alcohols having 3 to 8 carbon atoms, linear secondary alcohols having 1 to 8 carbon atoms, and branched secondary alcohols having 3 to 8 carbon atoms, and
the clear coating composition has a solid concentration at a time of application of 55% by mass or more.

[2]
The clear coating composition according to [1], wherein the primary hydroxy group-containing acrylic resin (A1) has an acid value of 0 mg KOH/g or more and 40 mg KOH/g or less.

[3]
The clear coating composition according to [1] or [2], wherein the secondary hydroxy group-containing acrylic resin (A2) has an acid value of 0 mg KOH/g or more and 40 mg KOH/g or less.

[4]
The clear coating composition according to any one of [1] to [3], wherein a glass transition temperature Tg(A1) of the primary hydroxy group-containing acrylic resin (A1) is −20° C. or higher and 60° C. or lower.

[5]
The clear coating composition according to any one of [1] to [4], wherein a glass transition temperature Tg(A2) of the secondary hydroxy group-containing acrylic resin (A2) is −30° C. or higher and 35° C. or lower.

[6]
The clear coating composition according to any one of [1] to [5], wherein the organic solvent (C) further includes a ketone compound.

[7]
The clear coating composition according to any one of [1] to [6], wherein a mass ratio (A1)/(A2) of a content of the primary hydroxy group-containing acrylic resin (A1) to a content of the secondary hydroxy group-containing acrylic resin (A2) is 1/99 to 80/20.

[8]
The clear coating composition according to any one of [1] to [7], wherein the alcohol solvent is at least one member selected from the group consisting of linear primary alcohols having 3 to 5 carbon atoms and branched primary alcohols having 3 to 5 carbon atoms.

[9]
The clear coating composition according to any one of [1] to [8], wherein the weight average molecular weight of the primary hydroxy group-containing acrylic resin (A1) is 3,000 or more and 6,000 or less.

[10]
The clear coating composition according to any one of [1] to [9], wherein the organic solvent (C) further includes at least one organic solvent selected from the group consisting of monocarboxylic acid esters, dibasic ester compounds, cellosolves, and carbitols and having a boiling point of 200° C. or higher.

[11]
A method for producing a coated article, comprising:
applying a base coating composition onto an article to be coated to form an uncured base coating film;

applying a clear coating composition to the uncured base coating film to form an uncured clear coating film; and
simultaneously curing the uncured base coating film and the uncured clear coating film,
wherein
the clear coating composition includes:
  a hydroxy group-containing acrylic resin (A);
  a polyisocyanate compound (B); and
  an organic solvent (C),
the hydroxy group-containing acrylic resin (A) includes a primary hydroxy group-containing acrylic resin (A1) and a secondary hydroxy group-containing acrylic resin (A2),
the primary hydroxy group-containing acrylic resin (A1) has a weight average molecular weight of 6,000 or less,
the secondary hydroxy group-containing acrylic resin (A2) has a weight average molecular weight of 6,000 or more,
the organic solvent (C) includes at least one alcohol solvent selected from the group consisting of linear primary alcohols having 1 to 8 carbon atoms, branched primary alcohols having 3 to 8 carbon atoms, linear secondary alcohols having 1 to 8 carbon atoms, and branched secondary alcohols having 3 to 8 carbon atoms, and
the clear coating composition has a solid concentration at a time of application of 55% by mass or more.

Effects of the Invention

In accordance with the present invention, it is possible to provide a clear coating composition which affords a coating film having superior resistance to color shift and is superior in coating workability while having a high solid content. In accordance with the present invention, a method for producing a coated article using the clear coating composition can be further provided.

DETAILED DESCRIPTION

[Clear Coating Composition]

The clear coating composition according to the present disclosure includes a hydroxy group-containing acrylic resin (A), a polyisocyanate compound (B), and an organic solvent (C). The hydroxy group-containing acrylic resin (A) includes a primary hydroxy group-containing acrylic resin (A1) and a secondary hydroxy group-containing acrylic resin (A2). The primary hydroxy group-containing acrylic resin (A1) has a weight average molecular weight (Mw) of 6,000 or less. The secondary hydroxy group-containing acrylic resin (A2) has a weight average molecular weight (Mw) of 6,000 or more. The organic solvent (C) includes the specific primary alcohol and/or secondary alcohol mentioned above. The clear coating composition has a solid concentration at the time of application of 55% by mass or more.

The clear coating composition is of two-pack type composed of a base agent including the hydroxy group-containing acrylic resin (A) and a solvent and a curing agent including the polyisocyanate compound (B) and a solvent. At least a part of the solvent contained in the base agent is the organic solvent (C) including the specific primary alcohol and/or secondary alcohol mentioned above.

The solid concentration at the time of application of the clear coating composition is the solid concentration of the clear coating composition immediately after mixing the base agent and the curing agent (within 10 minutes after the mixing) and immediately before application (within 10 minutes before the application). The solid concentration at the time of application of the clear coating composition is determined by measuring the mass of a residue after heating at 140° C. for 30 minutes (also referred to as heating residue) of the clear coating composition within 10 minutes after the mixing of the base agent and the curing agent.

The solid concentration at the time of application, $C_1$, of the clear coating composition can be calculated specifically as follows. First, the mass (initial mass $W_0$) of an aluminum cup having an appropriate size is measured. Subsequently, the clear coating composition within 10 minutes after mixing the base agent and the curing agent is charged into the aluminum cup, and the mass ($W_1$) is measured within 10 minutes after the charging.

Next, the aluminum cup is heated at 140° C. for 30 minutes, and the mass ($W_2$) is measured again. $W_2$ is the total mass of the solid (the heating residue) of the clear coating composition and the aluminum cup. Finally, the solid concentration at the time of application, $C_1$, of the clear coating composition is determined using the following formula. ($W_1-W_0$) represents the total mass of the solvent and the solid remaining in the clear coating composition immediately after application. ($W_2-W_0$) represents the mass of only the solid of the clear coating composition.

$$\text{Solid concentration } C_1(\%) = 100 \times (W_2-W_0)/(W_1-W_0)$$

The viscosity of the clear coating composition at the time of application can be regarded as the viscosity of the clear coating composition immediately before application (within 10 minutes before application). The solid concentration $C_1$ of the clear coating composition may be 56% by mass or more, may be 58% by mass or more, and may be 60% by mass or more. The solid concentration $C_1$ of the clear coating composition may be 80% by mass or less, and may be 75% by mass or less.

In a two-pack type coating composition, when the solid concentration is high, the base agent and the curing agent easily react with each other, so that the pot life is generally likely to be short. The pot life is a time (or working life) during which the coating composition is able to be applied after mixing the base agent and the curing agent, and the intended coating film performance, finished appearance, designability, and so on can be exhibited. Since the coating composition existing beyond the pot life has an excessively high viscosity, the performance and appearance of a coating film obtained using the coating composition may be deteriorated. To prolong the pot life, it is conceivable to perform control such that a rapid reaction between the base agent and the curing agent does not occur, or to make it possible to maintain the viscosity low even when the reaction has proceeded before application.

In the present disclosure, from the viewpoint of reaction control, the primary hydroxy group-containing acrylic resin (A1) and the secondary hydroxy group-containing acrylic resin (A2) are used in combination as the base agent. Usually, a primary hydroxy group has higher reactivity than a secondary hydroxy group. The rate of a curing reaction can be controlled by using acrylic resins containing hydroxy groups having different reactivity in combination.

Furthermore, in order to maintain the viscosity low, an acrylic resin having a low molecular weight is used as the acrylic resin containing a primary hydroxy group with high reactivity. As a result, even when the reaction between the primary hydroxy group-containing acrylic resin (A1) and the polyisocyanate compound (B) proceeds after the base agent and the curing agent are mixed, the increase of the viscosity of the entire clear coating composition is inhibited.

That is, according to the present disclosure, since the molecular weight of the primary hydroxy group-containing acrylic resin (A1), which is higher in reactivity, is small, the reaction rate can be controlled, and the increase of the viscosity of the clear coating composition can be inhibited. Therefore, the pot life is prolonged, and the coating film performance and appearance of a resulting coating film are also improved. The appearance of a coating film can be evaluated, for example, on the basis of smoothness.

On the other hand, from the viewpoint of resistance to color shift, the secondary hydroxy group-containing acrylic resin (A2) to be used has a high molecular weight. The color shift refers to a phenomenon in which the components of the clear coating composition permeate and mix with a coating film underlying the clear coating composition (for example, a colored base coating film or a metallic base coating film) to deteriorate designability. For example, in the case where the underlying layer is a metallic base coating film having a luster pigment, when the components of the clear coating composition permeate the lower layer, the arrangement of the luster pigment is disturbed, and a desired FF property (flip-flop property) cannot be obtained. Such decrease of the FF property is one example of color shift. Having resistance to color shift can be said to be performance in which the designability that can be exhibited by the coating film underlying the clear coating film is not impaired by the clear coating composition. Owing to the use of the secondary hydroxy group-containing acrylic resin (A2) having a large molecular weight, it becomes hard for the resin itself to penetrate into the underlayer, and permeation of other components having a small molecular weight into the underlayer is inhibited.

That is, according to the present disclosure, since the molecular weight of the secondary hydroxy group-containing acrylic resin (A2), which is lower in reactivity is large, the resistance to color shift can be improved.

The clear coating composition of the present disclosure can afford a coating film having a high solid concentration and being superior in designability owing to the use of the primary hydroxy group-containing acrylic resin (A1) and the secondary hydroxy group-containing acrylic resin (A2). That is, increase in solid content and coating film smoothness, which are contradictory performances, have been achieved.

On the other hand, when the thus developed high solid content coating composition achieving both of the above performances is applied in an application booth, it is found that the ease of cleaning after completion of the application is poor. The term "ease of cleaning" as used herein means ease of cleaning work of removing, after application, a coating composition adhering to an application booth or the like due to scattering of the coating material in spray application. For example, in coating using a reactive coating material, the coating composition attached to a booth may react and be cured during application, and may not be easily removed during cleaning. Then, it has been found that such ease of cleaning tends to be particularly poor with a high solid content coating material targeted by the present disclosure. Furthermore, it has also been found through experiments that the ease of cleaning does not necessarily correlate with the pot life of a two-pack type coating material.

The present inventors have also studied means capable of solving the above problems. Then, it has been experimentally found that the use of a specific alcohol solvent increases the ease of cleaning and improves the coating workability, leading to accomplishment of the clear coating composition of the present disclosure. In the present description, coating workability is evaluated in terms of ease of cleaning. Hereinafter, each component of the clear coating composition in the present disclosure will be described in detail.

(A) Hydroxy Group-Containing Acrylic Resin

The hydroxy group-containing acrylic resin (A) includes a primary hydroxy group-containing acrylic resin (A1) and a secondary hydroxy group-containing acrylic resin (A2).

The primary hydroxy group-containing acrylic resin (A1) (hereinafter, also referred to as first acrylic resin (A1)) contains a primary hydroxy group and does not contain a secondary hydroxy group. The secondary hydroxy group-containing acrylic resin (A2) (hereinafter, also referred to as second acrylic resin (A2)) contains at least a secondary hydroxy group, and may further contain a primary hydroxy group. The second acrylic resin (A2) may contain only a secondary hydroxy group.

The primary hydroxy group is a hydroxy group bonded to a carbon atom $C^{\alpha}$ to which only one carbon atom is bonded, and refers to an —OH group represented by "—$CR_2$—$C^{\alpha}H_2$—OH". The secondary hydroxy group is a hydroxy group bonded to a carbon atom $C^{\beta}$ to which two carbon atoms are bonded, and refers to an —OH group represented by "—$CR_2$—$C^{\beta}H(R^1)$—OH". R independently at each occurrence represents a hydrogen atom or a hydrocarbon group, and $R^1$ represents a hydrocarbon group.

The mass ratio (A1)/(A2) of the content of the first acrylic resin (A1) to the content of the second acrylic resin (A2) is, for example, 1/99 to 80/20. When the ratio of the first acrylic resin (A1) to the total mass of the first acrylic resin (A1) and the second acrylic resin (A2) is 1% by mass or more, the appearance of a resulting coating film can be further improved. When the ratio of the second acrylic resin (A2) to the total mass of the first acrylic resin (A1) and the second acrylic resin (A2) is 20% by mass or more, the resistance to color shift can be further improved.

When the mass ratio (A1)/(A2) is in the above range, both improvement in pot life, coating film performance and appearance, and improvement in resistance to color shift are easily achieved. The mass ratio (A1)/(A2) may be 20/80 to 70/30, 30/70 to 60/40, or 30/70 to 50/50.

(A1) Primary Hydroxy Group-Containing Acrylic Resin

The weight average molecular weight (Mw) of the primary hydroxy group-containing acrylic resin (first acrylic resin) (A1) is 6000 or less. Thanks to this, the viscosity of the clear coating composition during application is maintained low. The Mw of the first acrylic resin (A1) may be 5000 or less, 4500 or less, or 4000 or less.

The Mw of the first acrylic resin (A1) may be 1000 or more, 2000 or more, or 3000 or more. Thanks to this, a coating film with an increased hardness is readily obtained. In one aspect, the Mw of the first acrylic resin (A1) is 3000 or more and 6000 or less.

The Mw is determined by a GPC method using polystyrene as a standard.

The acid value of the first acrylic resin (A1) is, for example, 0 mg KOH/g or more and 40 mg KOH/g or less. Thanks to this, the working life (also referred to as pot life) after mixing with a curing agent can be sufficiently long. The acid value of the first acrylic resin (A1) may be 1 mg KOH/g or more, and may be 3 mg KOH/g or more. The acid value of the first acrylic resin (A1) may be 30 ng KOH/g or less, may be 24 mg KOH/g or less, and may be 10 mg KOH/g or less.

The hydroxyl value of the first acrylic resin (A1) is, for example, 80 mg KOH/g or more and 250 mug KOH/g or less. Thanks to this, a sufficient crosslinking density can be obtained, and the hardness of a resulting coating film can be improved. The hydroxyl value of the first acrylic resin (A1) may be 100 mg KOH/g or more, and may be 120 mg KOH/g or more. The hydroxyl value of the first acrylic resin (A1) may be 220 mg KOH/g or less, and may be 200 mg KOH/g or less.

The hydroxyl value and the acid value are determined on the basis on the solid mass. The hydroxyl value and the acid value can be measured by the publicly known method described in JIS K 0070: 1992. The hydroxyl value and the acid value may be calculated from the blending amount of the unsaturated monomer in the starting monomers of the resin (for example, the first acrylic resin (A1)).

The glass transition temperature (Tg) of the first acrylic resin (A1) is, for example, −20° C. or higher and 60° C. or lower. Thanks to this, the hardness and the durability such as weatherability of a resulting coating film can be improved. The Tg of the first acrylic resin (A1) may be 0° C. or higher, and may be 5° C. or higher. The Tg of the first acrylic resin (A1) may be 50° C. or lower, and may be 40° C. or lower.

The Tg may be determined by calculation from the type and amount of the starting monomers of the resin. The Tg may be measured with a differential scanning calorimeter (DSC).

The first acrylic resin (A1) can be prepared by polymerizing an α,β-ethylenically unsaturated monomer having only a primary hydroxy group and a third α,β-ethylenically unsaturated monomer containing neither a primary hydroxy group nor a secondary hydroxy group by a publicly known method. The first acrylic resin (A1) is prepared, for example, by solution polymerization.

Examples of the α,β-ethylenically unsaturated monomer having only a primary hydroxy group include 2-hydroxyethyl (meth)acrylate, 3-hydroxypropyl (meth)acrylate, 4-hydroxybutyl (meth)acrylate, 2-hydroxy-1-methyl (meth)acrylate, PLACCEL FM1 (s-caprolactone-modified hydroxyethyl methacrylate, manufactured by Daicel Chemical Industries, Ltd.), polyethylene glycol mono(meth)acrylate, and polypropylene glycol mono(meth)acrylate. These are used singly or two or more of them are used in combination.

Examples of the third α,β-ethylenically unsaturated monomer include (meth)acrylic acid ester monomers such as methyl (meth)acrylate, ethyl (meth)acrylate, propyl (meth)acrylate, butyl (meth)acrylate, hexyl (meth)acrylate, ethylhexyl (meth)acrylate, lauryl (meth)acrylate, phenyl (meth)acrylate, isobornyl (meth)acrylate, and cyclohexyl (meth)acrylate; acid group-containing α,β-ethylenically unsaturated monomers such as acrylic acid, methacrylic acid, acrylic acid dimer, crotonic acid, 2-acryloyloxyethylphthalic acid, 2-acryloyloxyethylsuccinic acid, ω-carboxy-polycaprolactone mono(meth)acrylate, maleic acid, fumaric acid, and itaconic acid; vinyl alcohol ester monomers, which are esterified products of vinyl alcohol with a carboxylic acid such as acetic acid or propionic acid; polymerizable unsaturated hydrocarbon monomers such as styrene, α-methylstyrene, vinylnaphthalene, butadiene, and isoprene; polymerizable nitrile monomers such as acrylonitrile and methacrylonitrile; and acrylamide monomers such as acrylamide, methacrylamide, N-maethyiolacrylamide, N,N-dimethylacrylamide, and diacetone acrylamide. These are used singly or two or more of them are used in combination.

"(Meth)acrylate" means acrylate and/or methacrylate.

(A2) Secondary Hydroxy Group-Containing Acrylic Resin

The weight average molecular weight (Mw) of the secondary hydroxy group-containing acrylic resin (second acrylic resin) (A2) is 6000 or more. As a result, the resistance to color shift of a coating film is improved. In addition, coating film properties such as hardness, chemical resistance, scratch resistance, and weatherability can be improved.

The Mw of the second acrylic resin (A2) may be 20000 or less, and may be 12000 or less. The Mw of the second acrylic resin (A2) may be 6500 or more, and may be 7000 or more.

The acid value of the second acrylic resin (A2) is, for example, 0 mag KOH/g or more and 50 mg KOH-1/g or less. The acid value of the second acrylic resin (A2) may be 1 mg KOH/g or more, may be 5 mg KOH/g or more, and may be 10 mg KOH/g or more. The acid value of the second acrylic resin (A2) may be 40 mg KOH/g or less, may be 35 wig 1 KOH/g or less, and may be 30 mg KOH/g or less. In one aspect, the acid value of the second acrylic resin (A2) is 0 mg KOH/g or more and 40 mg KOH/g or less.

The hydroxyl value of the second acrylic resin (A2) is, for example, 80 mg KOH/g or more and 250 mg KOH/g or less. Thanks to this, a sufficient crosslinking density can be obtained, and the hardness of a resulting coating film can be improved. The hydroxyl value of the second acrylic resin (A2) may be 100 mg KOH/g or more, and may be 120 mg KOH/g or more. The hydroxyl value of the second acrylic resin (A2) may be 220 mg KOH/g or less, and may be 200 mg KOH/g or less.

The acid value of each of the first acrylic resin (A1) and the second acrylic resin (A2) may be 0 mg KOH/g or more and 40 mg KOH/g or less. The acid value of the second acrylic resin (A2) may be higher than the acid value of the first acrylic resin (A1).

The glass transition temperature (Tg) of the second acrylic resin (A2) is, for example, −30° C. or higher and 35° C. or lower. Thanks to this, the hardness and the durability such as weatherability of a resulting coating fil can be improved. The Tg of the second acrylic resin (A2) may be −15° C. or higher, may be 0° C. or higher, and may be 5° C. or higher. The Tg of the second acrylic resin (A2) may be 30° C. or lower, may be 25° C. or lower, and may be 20° C. or lower.

It is allowable that the glass transition temperature Tg(A1) of the primary hydroxy group-containing acrylic resin (A1) is −20° C. or higher and 60° C. or lower and the glass transition temperature (Tg) of the second acrylic resin (A2) is −30° C. or higher and 35° C. or lower.

The second acrylic resin (A2) can be prepared by polymerizing an α,β-ethylenically unsaturated monomer having at least a secondary hydroxy group and a fourth α,β-ethylenically unsaturated monomer having no secondary hydroxy group by a publicly known method. The second acrylic resin (A2) is prepared, for example, by solution polymerization.

Examples of the α,β-ethylenically unsaturated monomer having at least a secondary hydroxy group include 2-hydroxypropyl (meth)acrylate, 2-hydroxybutyl (meth)acrylate, and 3-hydroxybutyl (meth)acrylate. These are used singly or two or more of them are used in combination.

Examples of the fourth α,β-ethylenically unsaturated monomer include the α,β-ethylenically unsaturated monomer having only a primary hydroxy group described above and the third α,β-ethylenically unsaturated monomer described above.

(Other Hydroxy Group-Containing Resin)

The clear coating composition may include another hydroxy group-containing resin. Examples of the other hydroxy group-containing resin include a hydroxy group-containing polycarbonate resin, a hydroxy group-containing urethane resin, a hydroxy group-containing polyester resin, and a hydroxy group-containing amino resin. These are used singly or two or more of them are used in combination.

The solid content of other hydroxy group-containing components accounting for in 100 parts by mass of the total solid content of the first and second acrylic resins (A1, A2) and the other hydroxy group-containing resin is, for example, 10 parts by mass or less, may be 5 parts by mass or less, and may be 3 parts by mass or less.

(Other Resins)

The clear coating composition may include other resins. Examples of the other resins include resins other than those described above, for example, polycarbonate resins, urethane resins, polyester resins, acrylic resins, and amino resins that contain no hydroxy group and are not included in the definitions described above. These are used singly or two or more of them are used in combination.

(B) Polyisocyanate Compound

The polyisocyanate compound (B) is a curing agent, and reacts with hydroxy group-containing resins to form a crosslinked structure, thereby curing the clear coating composition.

The polyisocyanate compound (B) has at least two isocyanate groups in one molecule. Examples of the polyisocyanate compound include aliphatic polyisocyanates, alicyclic polyisocyanates, aliphatic polyisocyanates having an aromatic ring not bonded to an isocyanate group in the molecule (araliphatic polyisocyanates), aromatic polyisocyanates, and derivatives of these polyisocyanates. The examples specifically include aromatic polyisocyanates such as tolylene diisocyanate, 4,4'-diphenylmethane diisocyanate, xylylene diisocyanate, and metaxylylene diisocyanate; aliphatic polyisocyanates such as hexamethylene diisocyanate; alicyclic polyisocyanates such as isophorone diisocyanate; and multimers thereof such as biuret type multimers, nurate type multimers, and adduct type multimers. These are used singly or two or more of them are used in combination.

The equivalent ratio (NCO/OH) of the isocyanate groups contained in the polyisocyanate compound (B) to the hydroxy groups contained in the hydroxy group-containing resins may be 0.7 or more, and may be 0.8 or more. The equivalent ratio (NCO/OH) may be 2.0 or less, may be 1.8 or less, and may be 0.5 or less. In one aspect, the equivalent ratio (NCO/OH) is 0.7 or more and 2.0 or less. When the equivalent ratio (NCO/OH) is in this range, a clear coating film having superior hardness and weatherability is likely to be formed.

(Other Curing Agents)

The clear coating composition may include a curing agent other than the polyisocyanate compound (B). Examples of the other curing agent include amino resins, epoxy compounds, aziridine compounds, carbodiimide compounds, and oxazoline compounds. These are used singly or two or more of them are used in combination. The content of the other curing agent is appropriately set according to the hydroxy group-containing resins.

(C) Organic Solvent

The organic solvent (C) includes at least one alcohol solvent selected from the group consisting of a linear primary alcohol having 1 to 6 carbon atoms, a branched primary alcohol having 3 to 8 carbon atoms, a linear secondary alcohol having 1 to 6 carbon atoms, and a branched secondary alcohol having 3 to 8 carbon atoms. Owing to the fact that the clear coating composition of the present disclosure contains the alcohol solvent, even a clear coating composition having a high solid concentration has advantages of having high ease of cleaning and being superior in coating workability.

Examples of the linear primary alcohols having 1 to 6 carbon atoms, which is one kind of the alcohol solvent, include methanol, ethanol, propan-1-ol, butan-1-ol, pentan-1-ol, and hexan-1-ol.

Examples of the branched primary alcohol having 3 to 8 carbon atoms include isobutanol, 3-methyl-1-butanol, 2-ethyl-1-pentanol, and 2-ethylhexanol.

Examples of the linear secondary alcohol having 1 to 6 carbon atoms and the branched secondary alcohol having 3 to 8 carbon atoms include propan-2-ol, butan-2-ol, pentan-2-ol, hexan-2-ol, heptan-2-ol, 2-methylbutan-1-ol, and cyclohexanol.

The alcohol solvent is more preferably at least one selected from the group consisting of a linear primary alcohol having 3 to 5 carbon atoms and a branched primary alcohol having 3 to 5 carbon atoms from the viewpoint of improving the ease of cleaning, and is more preferably at least one selected from the group consisting of a linear primary alcohol having 4 to 5 carbon atoms and a branched primary alcohol having 4 to 5 carbon atoms.

The content of the alcohol solvent is preferably 10% by mass or more based on the total mass of the organic solvent (C). The content of the alcohol solvent may be 12% by mass or more. The content of the alcohol solvent may be 60% by mass or less, and may be 50% by mass or less.

The organic solvent (C) preferably further includes a ketone compound. The ketone compound is more preferably a ketone compound having 7 or more carbon atoms. The fact that the organic solvent (C) further includes the ketone compound offers an advantage that the viscosity of the clear coating composition having a high solid concentration during application can be controlled within an appropriate range. In addition, the ketone compound has a small influence on the characteristics of other components contained in the clear coating composition. Therefore, the characteristics of the other components contained in the clear coating composition are sufficiently exhibited, and the physical properties of a resulting coating film can be improved.

When the organic solvent (C) further includes the ketone compound having 7 or more carbon atoms, particularly when the organic solvent (C) includes the ketone compound having 7 or more carbon atoms, there is an advantage that the viscosity of the clear coating composition having a high solid concentration during application can be controlled within an appropriate range, and as a result, the appearance of a resulting coating film is improved. In addition, there also is an advantage that coating workability is improved. Although not being bound by any specific theory, it is considered that the ketone compound having 7 or more carbon atoms has a relatively low evaporation rate and can disperse the secondary hydroxy group-containing acrylic resin (A2) with a high molecular weight well.

The ketone compound has a structure of —C(=O). Examples of the ketone compound include methyl amyl ketone (MAK), methyl-1-amyl ketone (MIAK), 3-heptanone, 4-heptanone, 2-octanone, diisobutyl ketone, and isophorone. Among them, the ketone compound is preferably linear from the viewpoint of high solubility of the hydroxy group-containing acrylic resin (A). Examples of a linear ketone compound include MAK and 2-octanone.

The number of the carbon atoms of the ketone compound may be 8 or more from the viewpoint of an evaporation rate. The number of the carbon atoms of the ketone compound may be 9 or less from the viewpoint of the solubility of the hydroxy group-containing acrylic resin (A). The number of the carbon atoms of the ketone compound may be 7.

When the organic solvent (C) includes a ketone compound having 7 or more carbon atoms, since the viscosity at the time of application is controlled within a more appropriate range, there is an advantage that the appearance of a resulting coating film is further improved even when the cl ear coating composition has such a high solid concentration.

The ketone compound having 7 or more carbon atoms further has an advantage that the solid concentration at 60 seconds after application (hereinafter, referred to as coating solid concentration $C_{60}$) during spray application of the clear coating composition is controlled within an appropriate range. The coating solid concentration $C_{60}$ of the clear coating composition according to the present disclosure is, for example, 60% by mass or more and 80% by mass or less. By maintaining a state in which the solid concentration is not excessively high for a certain period of time even after the clear coating composition adheres, the self-leveling function of the coating composition acts, and the smoothness of the resulting coating film can be further improved.

During application, since a part of the solvent is volatilized, the solid concentration of the coating material after the application is usually high. In conventional coating materials, a solvent having a small molecular weight such as butyl acetate is used in order to lower the viscosity during application while increasing the solid concentration at the time of application. Since a solvent having a small molecular weight generally has high volatility, the solid concentration of the coating material immediately after being applied to an article to be coated tends to be further increased. Therefore, the self-leveling function cannot act, and the smoothness of a resulting coating film is more prone to be deteriorated. Since the ketone compound having 7 or more carbon atoms, which can be suitably used in the clear coating composition according to the present disclosure, has a relatively low evaporation rate, it is considered that the coating solid concentration $C_6a$ can be maintained in an appropriate range. The coating solid concentration $C_{60}$ may be 65% by mass or more, and may be 70% by mass or more. The coating solid concentration $C_{60}$ may be 79% by mass or less, and may be 78% by mass or less.

The coating solid concentration $C_{60}$ of the clear coating composition can be calculated as follows. First, the mass (initial mass No) of a substrate (for example, an aluminum film) having an appropriate size is measured. Subsequently, the clear coating composition is applied to the substrate by spray application. After 60 seconds from the end of the spray application, the substrate is folded with the surface to which the clear coating composition adheres facing inward so that the solvent is not volatilized. The mass ($W_{wet}$) of the substrate with the uncured clear coating composition is measured. $W_{wet}$ is the total mass of the solvent and the solid content remaining in the clear coating composition after 60 seconds of spray application and the substrate.

The substrate is then opened and heated in this state at 140° C. for 30 minutes to cure the clear coating composition. Thereafter, the mass ($W_{dry}$) of the substrate including the cured clear coating composition is measured. $W_{dry}$ is the total mass of the solid of the clear coating composition and the substrate.

Finally, the coating solid concentration $C_{60}$ is determined using the following formula. ($W_{wet}-W_0$) represents the total mass of the solvent and the solid remaining in the clear coating composition at 60 seconds after the spray application. ($W_{dry}-W_0$) represents the mass of only the solid of the clear coating composition.

Coating solid concentration $C_{60}(\%)=100\times(W_{dry}-W_0)/(W_{wet}-W_0)$

The organic solvent (C) may further include another organic solvent other than the alcohol solvent and the ketone compound. Examples of the other organic solvent include aromatic hydrocarbons such as benzene, toluene, ethylbenzene, propylbenzene, t-butylbenzene, o-xylene, m-xylene, p-xylene, tetralin, and decalin; monocarboxylic acid esters such as methyl acetate, ethyl acetate, n-butyl acetate, amyl acetate, and diethylene glycol monobutyl ether acetate (butyl carbitol acetate); dibasic ester compounds; cellosolves such as methyl cellosolve, ethyl cellosolve, n-propyl cellosolve, i-propyl cellosolve, n-butyl cellosolve, i-butyl cellosolve, i-amyl cellosolve, phenyl cellosolve, and beryl cellosolve; carbitols such as methyl carbitol, ethyl carbitol, n-propyl carbitol, i-propyl carbitol, n-butyl carbitol, i-butyl carbitol, i-amyl carbitol, carbitol acetate, phenyl carbitol, and benzyl carbitol; and ethers such as ethylene glycol monoisopropyl ether, ethylene glycol monoethyl ether, ethylene glycol mono-n-propyl ether, ethylene glycol mono-n-butyl ether, ethylene glycol mono-t-butyl ether, propylene glycol monomethyl ether, propylene glycol monoethyl ether, propylene glycol mono-n-propyl ether, propylene glycol mono-n-butyl ether, propylene glycol monomethyl ether acetate, propylene glycol monoethyl ether acetate, and dioxane. These are used singly or two or more of them are used in combination.

However, when an organic solvent is blended in the curing agent, the organic solvent is required to be an organic solvent having no hydroxy group.

In one aspect of the present disclosure, the organic solvent (C) may include an organic solvent having a boiling point of 200° C. or higher together with the alcohol solvent. Thanks to this, the resistance to color shift and the appearance of a resulting coating film can be further improved. In particular, at least one member having a boiling point of 200° C. or higher selected from the group consisting of monocarboxylic acid esters, dibasic ester compounds, cellosolves, and carbitols may be included. These organic solvents having a boiling point of 200° C. or higher are used singly or two or more of them are used in combination.

The dibasic ester compound (also referred to as dibasic acid ester) is obtained via a reaction of a dicarboxylic acid with an alcohol. The dibasic ester compound is represented by the following general formula:

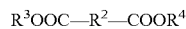

$R^3OOC-R^2-COOR^4$ wherein $R^2$, $R^3$, and $R^4$ are each independently an aliphatic hydrocarbon group, an alicyclic hydrocarbon group, an aliphatic hydrocarbon group having an aromatic ring, or an aromatic hydrocarbon group having an aromatic ring.

$R^2$ may be an aliphatic hydrocarbon group. In $R^2$, the number of the carbon atoms of the aliphatic hydrocarbon group may be 1 to 6, may be 2 to 6, and may be 2 to 4. In $R^2$, the aliphatic hydrocarbon group may be either saturated or unsaturated. In $R^2$, the aliphatic hydrocarbon group may be either linear or branched. $R^2$ may be a linear saturated aliphatic hydrocarbon group having 1 to 6 carbon atoms.

$R^3$ and $R^4$ each may be an aliphatic hydrocarbon group. In each of $R^3$ and $R^4$, the number of the carbon atoms of the aliphatic hydrocarbon group may be 1 to 6, may be 1 to 3, and may be 1 or 2. In each of $R^3$ and $R^4$, the aliphatic hydrocarbon group may be either saturated or unsaturated. In each of $R^3$ and $R^4$, the aliphatic hydrocarbon group may be either linear or branched. $R^3$ and $R^4$ each may be a linear saturated aliphatic hydrocarbon group having 1 to 6 carbon atoms. R and R may be either the same or different. $R^3$ and $R^4$ may be the came.

Examples of suitable dibasic ester compounds specifically include dimethyl succinate, diethyl succinate, di-n-propyl succinate, di-n-butyl succinate, di-n-pentyl succinate, di-n-hexyl succinate, dimethyl glutarate, diethyl glutarate, di-n-propyl glutarate, di-n-butyl glutarate, di-n-pentyl glutarate, di-n-hexyl glutarate, dimethyl adipate, diethyl adipate, di-n-propyl adipate, di-n-butyl adipate, di-n-pentyl adipate, di-n-hexyl adipate, dimethyl pimelate, diethyl pimelate, di-n-propyl pimelate, di-n-butyl pimelate, di-n-pentyl pimelate, di-n-hexyl pimelate, dimethyl suberate, diethyl suberate, di-n-propyl suberate, di-n-butyl suberate, di-n-pentyl suberate, di-n-hexyl suberate, dimethyl azelate, diethyl azelate, di-n-propyl azelate, di-n-butyl azelate, di-n-pentyl azelate, and di-n-hexyl azelate. These are used singly or two or more of them are used in combination. For example, an alkyl ester of succinic acid, an alkyl ester of glutaric acid, and an alkyl ester of adipic acid may be used in combination.

In the clear coating composition, when the organic solvent (C) further includes the ketone compound, the content thereof may be, for example, 50 parts by mass or more and 550 parts by mass or less per 100 parts by mass of the content of the alcohol solvent. The content of the ketone compound may be 70 parts by mass or more, and may be 75 parts by mass or more. The content of the ketone compound may be 500 parts by mass or less, and may be 200 parts by mass or less. When the organic solvent (C) further includes the organic solvent having a boiling point of 200'C or higher described above, the content thereof may be, for example, 30 parts by mass or more and 200 parts by mass or less per 100 parts by mass of the content of the alcohol solvent. The content of the organic solvent having a boiling point of 200° C. or higher may be 40 parts by mass or more. The content of the organic solvent having a boiling point of 200° C. or higher may be 180 parts by mass or less, and may be 120 parts by mass or less.

The organic solvent (C) may include the alcohol solvent together with an organic solvent having a boiling point of lower than 2000° C. other than the alcohol solvent. The content of such other organic solvent may be, for example, less than 20 parts by mass, may be 10 parts by mass or less, may be 5 parts by mass or less, or may be 0 parts by mass per 100 parts by mass of the content of the alcohol solvent.

(Other Components)

The clear coating composition may further include a pigment and various additives. Examples of the additives include an ultraviolet absorber, an antioxidant, an antifoaming agent, a surface conditioning agent, and a pinhole inhibitor.

[Coated Article]

With the clear coating composition according to the present disclosure, a coated article is obtained. The coated article includes, for example, an article to be coated and a multilayer coating film including a base coating film and a clear coating film. The clear coating film is formed from the clear coating composition according to the present disclosure. Therefore, the coated article has superior resistance to color shift and appearance.

The base coating film is disposed between the article to be coated and the clear coating film. The multilayer coating film may further include an intermediate coating film disposed between the article to be coated and the base coating film. That is, the coated article may include an article to be coated and a multilayer coating film in which an intermediate coating film, a base coating film, and a clear coating film are laminated in this order.

(Article to be Coated)

Examples of the material of the article to be coated include metal, resin, and glass. Examples of the article to be coated specifically include automobile bodies such as passenger cars, trucks, motorcycles, and buses, parts for automobile bodies, and automobile parts such as spoilers, bumpers, mirror covers, grilles, and door knobs.

Examples of the metal include iron, copper, aluminum, tin, zinc, and alloys thereof (e.g., steel). Examples of a metallic article to be coated typically include steel sheets such as cold-rolled steel sheets, hot-rolled steel sheets, stainless steels, electrogalvanized steel sheets, hot-dip galvanized steel sheets, zinc-aluminum alloy-based plated steel sheets, zinc-iron alloy-based plated steel sheets, zinc-magnesium alloy-based plated steel sheets, zinc-aluminum-magnesium alloy-based plated steel sheets, aluminum-based plated steel sheets, aluminum-silicon alloy-based plated steel sheets, and tin-based plated steel sheets.

The metallic article to be coated may have been subjected to surface treatment. Examples of the surface treatment include phosphate salt treatment, chromate treatment, zirconium chemical conversion treatment, and composite oxide treatment. The metallic article to be coated may have been further coated with an electrodeposition coating material after the surface treatment. The electrodeposition coating material may be of a cationic type or of an anionic type.

Examples of the resin include polypropylene resin, polycarbonate resin, urethane resin, polyester resin, polystyrene resin, ABS resin, vinyl chloride resin, and polyamide resin. The resin article to be coated may have been subjected to degreasing treatment.

(Intermediate Coating Film)

The intermediate coating film is formed from an intermediate coating composition. The intermediate coating composition will be described later. The thickness after curing (dry film thickness) of the intermediate coating film is, for example, 5 μm or more and 80 μm or less. The dry film thickness of the intermediate coating film may be 10 μm or more. The dry film thickness of the intermediate coating film may be 50 μm or less.

The thickness of the coating film can be measured with an electromagnetic coating thickness meter (for example, SDM-miniR manufactured by SANKO). The thickness of the coating film is an average value of the thicknesses of the coating film at arbitrary five points.

(Base Coating Film)

The base coating film is formed from a base coating composition. The base coating composition will be described later. The base coating film may be a single layer or a laminated coating film having two or more layers. The dry film thickness per layer of the base coating film is, for example, 5 μm or more and 35 μm or less. The dry film thickness per layer of the base coating film may be 7 μm or more. The dry film thickness per layer of the base coating film may be 30 μm or less.

(Clear Coating Film)

The clear coating film is formed from the clear coating composition according to the present disclosure. The dry film thickness of the clear coating film is, for example, 10 μm or more and 80 μm or less. The dry film thickness of the clear coating film may be 20 m or more. The dry film thickness of the clear coating film may be 60 μm or less.

[Method for Producing Coated Article]

The coated article is produced, for example, by a method including applying a base coating composition to an article to be coated to form an uncured base coating film, applying the clear coating composition according to the present disclosure to the uncured base coating film to form an uncured clear coating film, and curing the uncured base coating film and the uncured clear coating film at the same time.

Before the step of applying the base coating composition, a step of applying an intermediate coating composition to the article to be coated may be performed. When the base coating composition is applied, the intermediate coating film may be either cured or uncured. When the base coating composition is applied, the intermediate coating film may be cured.

Specifically, the coated article may be produced by a method (2-coat 1-bake method) including applying an intermediate coating composition to an article to be coated and then curing the composition to form a cured intermediate coating film, sequentially applying a base coating composition and a clear coating composition to the cured intermediate coating film to form an uncured base coating film and an uncured clear coating film in this order, and curing the uncured base coating film and the uncured clear coating film at once.

The coated article may also be produced by a method (3-coat 1-bake method) including sequentially applying an intermediate coating composition, a base coating composition, and a clear coating composition to an article to be coated to form an uncured intermediate coating film, an uncured base coating film, and an uncured clear coating film in this order; and curing the uncured intermediate coating film, the uncured base coating film, and the uncured clear coating film at once.

In the following, each of the steps will be described by taking as an example a case of producing a coated article including a multilayer coating film in which an intermediate coating film, a base coating film, and a clear coating film are laminated in this order by the 2-coat 1-bake method. However, the method for producing the coated article is not limited thereto.

(I) Step of Forming Cured Intermediate Coating Film

First, an intermediate coating composition is applied to an article to be coated to form an uncured intermediate coating film. The intermediate coating film improves adhesion between a base coating film and the article to be coated. The intermediate coating makes the coating surface uniform, and the unevenness of the base coating film is easily controlled.

Examples of the applying method include a roll coater method, air spray application, airless spray application, and rotary atomization application. These methods may be combined with electrostatic coating. In particular, rotary atomization type electrostatic application is preferable from the viewpoint of coating efficiency. For the rotary atomization type electrostatic application, for example, a rotary atomization type electrostatic coating machine commonly called "micro micro bell (μμ bell)", "micro bell (μ bell)", "metallic bell", or the like may be used.

Next, the uncured intermediate coating film is cured. The intermediate coating composition can be cured by heating. The curing (heating) conditions are appropriately set according to the composition of the intermediate coating composition, the material of the article to be coated, and so on. The heating temperature is, for example, 100° C. or higher and 180° C. or lower, and may be 120° C. or higher and 160° C. or lower. The heating time may be appropriately set according to the heating temperature. When the heating temperature is 100° C. or higher and 180° C. or lower, the heating time is, for example, 10 minutes or more and 60 minutes or less, and may be 10 minutes or more and 30 minutes or less. The heating time means a time during which the temperature in a heating device reaches a target temperature and the article to be coated is maintained at the target temperature, and the time taken until the temperature reaches the target temperature is not considered. Examples of the heating device include a drying furnace using a heating source such as hot air, electricity, gas, or infrared rays.

(Intermediate Coating Composition)

The intermediate coating composition may be either aqueous or solvent-based. The aqueous coating composition contains water as a solvent in an amount of 50% by mass or more of the entire solvent. The solvent-based coating composition contains an organic solvent as a solvent in an amount of 50% by mass or more of the entire solvent.

The intermediate coating composition contains, for example, a resin, a pigment, and various additives in addition to various solvents. Examples of the resin include an acrylic resin, a polyester resin, a polyurethane resin, an alkyd resin, a fluororesin, an epoxy resin, and a polyether resin. These are used singly or two or more of them are used in combination. The intermediate coating composition may further include the curing agent described above.

(II) Step of Forming Uncured Base Coating Film

A base coating composition is applied to the cured intermediate coating film to form an uncured base coating film. Two or more uncured base coating films can be formed by applying the same base coating composition or different base coating compositions twice or more. An interval of several minutes may be provided between the nth application of the base coating composition and the (n+1)th application of the base coating composition.

Examples of the applying method include the same methods as the methods of applying the intermediate coating composition.

Preliminary drying (also referred to as preheating) may be carried out after applying the base coating composition and before applying the clear coating composition. As a result, a diluent component contained in the base coating composition is inhibited from bumping in the curing step, so that the occurrence of pops is easily controlled. Further, the preliminary drying inhibits the mixing of the uncured base coating film and the clear coating composition, so that a mixed layer is hardly formed. Therefore, the smoothness of a resulting coated article can be further improved.

Examples of the preliminary drying include a method in which the item to be dried is left standing for 5 minutes or more and 15 minutes or less under a temperature condition of 20° C. or higher and 25° C. or lower, and a method in which the item to be dried is heated for 30 seconds or more and 10 minutes or less under a temperature condition of 50° C. or higher and 80° C. or lower.

(Base Coating Composition)

The base coating composition may be either aqueous or solvent-based. The base coating composition may be aqueous. The aqueous base coating composition contains, for example, an acrylic resin emulsion, a water-soluble acrylic resin, a curing agent (typically, a melamine resin), and a polyether polyol resin. The base coating composition may further contain a pigment and various additives.

(III) Step of Forming Uncured Clear Coating Film

The clear coating composition according to the present disclosure is applied to the uncured base coating film to form an uncured clear coating film.

The applying method is not particularly limited. Examples of the applying method include the same methods as the methods of applying the intermediate coating composition. In particular, rotary atomization type electrostatic application is preferable from the viewpoint of coating efficiency. After applying the clear coating composition, preliminary drying may be carried out in the same manner as described above.

(IV) Curing Step

The uncured base coating film and the uncured clear coating film are cured at once. Each coating film can be cured by heating. The heating conditions may be the same as those for the intermediate coating film.

EXAMPLES

The present invention will be described hereafter in more detail by way of examples, to which the present invention is not intended to be limited. In the examples, "parts" and "% W" are on a mass basis unless otherwise indicated.

First, a plurality of types of first acrylic resins (A1) and second acrylic resins (A2) were produced as follows. Physical property values of the hydroxy group-containing acrylic resins produced are collectively shown in Table 1.

The solid concentration of the varnishes obtained in Production Examples 1-1 to 1-3 and Production Examples 2-1 to 2-5 was determined by measuring the mass of a residue (heating residue) after heating at 150° C. for 60 minutes.

Production Example 1-1

Production of First Acrylic Resin (A1-1)

Into an autoclave equipped with a stirrer, a temperature controller, a reflux condenser, a nitrogen inlet tube, and a liquid feeding pump was charged 24.2 parts by mass of butyl acetate, and then heated to 170° C. A monomer solution (mixed liquid of 20 parts by mass of styrene, 13.2 parts by mass of 2-ethylhexyl acrylate, 26.4 parts by mass of 2-ethylhexyl methacrylate, 39.4 parts by mass of 2-hydroxyethyl methacrylate, and 1.0 parts by mass of methacrylic acid) and a mixed solution of 1.65 parts by mass of di-tert-amyl peroxide and 7.74 parts by mass of butyl acetate were added dropwise with a liquid feeding pump to the autoclave over 3 hours.

After completion of the dropwise addition, the temperature was maintained at 170° C. for 30 minutes, and then cooled to 120° C. over 30 minutes. Subsequently, a mixed solution of 0.2 parts by mass of di-tert-amyl peroxy-2-ethylhexanoate and 2.0 parts by mass of butyl acetate was added dropwise with a liquid feeding pump over 30 minutes.

Subsequently, the reaction was continued at 120° C. for 1 hour, and then 6.4 parts by mass of butyl acetate was added. Thus, a varnish having a solid concentration of 70.0% by mass and containing the first acrylic resin (A1-1) having an Mw of 4,000, a hydroxyl value of 170 mg KOH/g, an acid value of 7 mg KOH/g, and a Tg of 20° C. was obtained.

Production Example 1-2

Production of First Acrylic Resin (A1-2)

A varnish having a solid concentration of 70.1% by mass and containing the first acrylic resin (A1-2) having an Mw of 6000, a hydroxyl value of 170 mg KOH/g, an acid value of 7 mg KOH/g, and a Tg of 20° C. was obtained in the same manner as in Production Example 1-1 except that the amount of di-tert-amyl peroxide added dropwise together with the monomer solution was changed to 1.08 parts by mass.

Production Example 1-3

Production of First Acrylic Resin (A1-3)

A varnish having a solid concentration of 70.0% by mass and containing the first acrylic resin (A1-3) having an Mw of 4,000, a hydroxyl value of 170 mg KOH/g, an acid value of 25 mg KOH/g, and a Tg of 20° C. was obtained in the same manner as in Production Example: 1-1 except that the amount of 2-ethylhexyl acrylate, the amount of 2-ethylhexyl methacrylate, and the amount of methacrylic acid in the monomer solution were changed to 17.4 parts by mass, 19.4 parts by mass, and 3.8 parts by mass, respectively.

Production Example 2-1

Production of Second Acrylic Resin (A2-1)

Into a vessel equipped with a stirrer, a temperature controller, and a reflux condenser was charged 38.2 parts by mass of butyl acetate, and then heated to 120° C. A monomer solution (mixed liquid of 20 parts by mass of styrene, 15.8 parts by mass of n-butyl acrylate, 21.8 parts by mass of n-butyl methacrylate, 41.1 parts by mass of 2-hydroxypropyl methacrylate, and 1.3 parts by mass of acrylic acid) and a mixed solution of 11.0 parts by mass of tert-butyl peroxy-2-ethylhexanoate and 5 parts by mass of butyl acetate were added dropwise to the vessel simultaneously over 3 hours.

The mixture was allowed to stand for 30 minutes, and then a mixed solution of 0.5 parts by mass of tert-butyl peroxy-2-ethylhexanoate and 4 parts by mass of butyl acetate was added dropwise over 30 minutes. Subsequently, the reaction was continued at 120° C. for 1 hour, and then 7 parts by mass of butyl acetate was added. Thus, a varnish having a solid concentration of 64.5% by mass and containing the second acrylic resin (A2-1) containing a secondary hydroxy group and having an Mw of 8,000, a hydroxyl value of 160 mg KOH/g, an acid value of 10 mg KOH/g, and a Tg of 20° C. was obtained.

Production Example 2-21

Production of Second Acrylic Resin (A2-2)

A varnish having a solid concentration of 64.8% by mass and containing the second acrylic resin (A2-2) containing a secondary hydroxy group and having an Mw of 12,000, a hydroxyl value of 160 mg KOH/g, an acid value of 10 mg KOH/g, and a Tg of 20° C. was obtained in the same manner as in Production Example 2-1 except that the amount of tert-butyl peroxy-2-ethylhexanoate added dropwise together with the monomer solution was changed to 4.5 parts by mass.

Production Example 2-3

Production of Second Acrylic Resin (A2-3)

A varnish having a solid concentration of 64.2% by mass and containing the second acrylic resin (A2-3) containing a secondary hydroxy group and having an Mw of 8,000, a hydroxyl value of 160 mg KOH/g, an acid value of 45 mg KOH/g, and a Tg of C was obtained in the same manner as in Production Example 2-1 except that the amount of n-butyl acrylate, the amount of n-butyl methacrylate, and the amount of acrylic acid in the monomer solution were changed to 18.3 parts by mass, 14.8 parts by mass, and 5.8 parts by mass, respectively.

Production Example 2-4

Production of Second Acrylic Resin (A2-4)
A varnish having a solid concentration of 65.1% by mass and containing the second acrylic resin (A2-4) containing a secondary hydroxy group and having an Mw of 15,000, a hydroxyl value of 160 mug KOH/g, an acid value of 10 mg KOH/g, and a Tg of 35° C. was obtained in the same manner as in Production Example 2-1 except that the amount of n-butyl acrylate and the amount of n-butyl methacrylate in the monomer solution were changed to 1.4 parts by mass and 36.2 parts by mass, respectively, and the amount of tert-butyl peroxy-2-ethylhexanoate added dropwise together with the monomer solution was changed to 3.0 parts by mass.

Production Example 2-5

Production of Second Acrylic Resin (A2-5)
A varnish having a solid concentration of 64.7% by mass and containing the second acrylic resin (A2-5) containing a secondary hydroxy group and having an Mw of 4,000, a hydroxyl value of 150 mg KOH/g, an acid value of 7 mg KOH/g, and a Tg of 10° C. was obtained in the same manner as in Production Example 1-1 except that the amount of 2-hydroxyethyl methacrylate and the amount of 2-hydroxypropyl methacrylate in the monomer solution were changed to 39.4 parts by mass and 39.4 parts by mass, respectively.

TABLE 1

| | | Acid value (mgKOH) | Hydroxyl value (mgKOH) | Mw | Tg (° C.) |
|---|---|---|---|---|---|
| Primary hydroxy group-containing acrylic resin (A1) | (A1-1) | 7.0 | 170 | 4000 | 20 |
| | (A1-2) | 7.0 | 170 | 6000 | 20 |
| | (A1-3) | 25.0 | 170 | 4000 | 20 |
| Secondary hydroxy group-containing acrylic resin (A2) | (A2-1) | 10.0 | 160 | 8000 | 20 |
| | (A2-2) | 10.0 | 160 | 12,000 | 20 |
| | (A2-3) | 45.0 | 160 | 8000 | 20 |
| | (A2-4) | 10.0 | 160 | 15000 | 35 |
| | (A2-5) | 7.0 | 150 | 4000 | 10 |

Example 1

(1) Preparation of Base Agent
To a 1 L metallic vessel were sequentially added 42 parts by mass of the first acrylic resin (A1-1), 18 parts by mass of the second acrylic resin (A2-1), 2.0 parts by mass of an ultraviolet absorber (Tinuvin 384, manufactured by BASF SE), 1.0 parts by mass of a light stabilizer (Tinuvin 123, manufactured by BASF SE), 1.0 parts by mass of an acrylic surface conditioning agent, 6 parts by mass of isobutanol, 30 parts by mass of methyl amyl ketone, and 7 parts by mass of DBE (dibasic ester compound, dimethyl glutarate, boiling point: about 205° C.), and were sufficiently stirred with a disper, affording a base agent. The mass of parts blended is the amount of solid.
(2) Preparation of Curing Agent
To another metallic vessel were sequentially added 40 parts by mass of a polyisocyanate compound (B-1.) (isocyanurate form of hexamethylene diisocyanate, Desmodur N-3300, manufactured by Sumika Covestro Urethane Co., Ltd., solid concentration: 100% by mass) and 12.0 parts by mass of methyl amyl ketone, and then were stirred, affording a curing agent.
(3) Preparation of Clear Coating Composition
The base agent and the curing agent were mixed, affording a clear coating composition. The clear coating composition had a solid concentration at the time of application (within 10 minutes after mixing) of 60% by mass.

Examples 2 to 18 and Comparative Examples 1 to 4

Clear coating compositions were prepared by the same procedure as in Example 1 except that the type and blending amount of the blending components, the solid amount at the time of application, and so on were changed as shown in Tables 2 to 4.
Details of each of the components shown in Tables 2 to 4 are as follows.
(Polyisocyanate Compound (B))
  (B-1): Sumidur N-3300 (isocyanurate form of hexamethylene diisocyanate manufactured by Sumika Covestro Urethane Co., Ltd, solid concentration: 100% by mass)
  (B-2): Desmodur N-3600 (isocyanurate form of hexamethylene diisocyanate manufactured by Sumika Covestro Urethane Co., Ltd., solid concentration: 100% by mass)
  (B-3): Duranate TKA-100 (isocyanurate form of hexamethylene diisocyanate manufactured by Asahi Kasei Corporation, solid concentration: 100% by mass)
  (B-4): Duranate TPA-100 (isocyanurate form of hexamethylene diisocyanate manufactured by Asahi Kasei Corporation, solid concentration: 100% by mass)
(Organic Solvent (C))
  (Alcohol solvent)
  Alcohol solvent (1): Isobutanol
  Alcohol solvent (2): n-Butanol
  Alcohol solvent (3): 1-Hexanol
  Alcohol solvent (4): 2-Butanol
  Alcohol solvent (5): t-Butyl alcohol
(Ketone Compound)
  MAK: Methyl amyl ketone
  (Organic solvent having boiling point of 200° C. or higher)
  DBE: Dibasic ester (mixture of dimethyl succinate, dimethyl glutarate, and dimethyl adipate manufactured by Shoei Chemical Co., Ltd., CAS No. 95481-62-2,), boiling point: 200° C.
(Others)
  UV absorber: Tinuvin 384, manufactured by BASF SE
  Light stabilizer: Tinuvin 123, manufactured by BASF SE
  Surface conditioning agent: BYK-350, manufactured by BYK Japan KK.
The solid concentration at the time of application of the clear coating compositions prepared in Examples and Comparative Examples was determined by the following procedure.
(Solid Concentration at the Time of Application, $C_1$)
The initial mass ($W_0$) of an aluminum cup having a diameter of about 6 cm was measured. A clear coating composition obtained by mixing a base agent and a curing agent was added thereto, and the mass ($W_1$) thereof was measured within 10 minutes after the mixing. This was heated at 140° C. for 30 minutes using a jet oven, allowed to cool, and then the mass ($W_2$) was measured again. Finally, the solid concentration at the time of application, C was determined by the following formula.

Solid concentration at the time of application $C_1$ (% by mass)=$100\times(W_2-W_0)(W_1-W_0)$ Evaluation The following evaluations were carried out using the clear coating compositions prepared in Examples and Comparative Examples. The results of the evaluations are shown in Tables 2 to 4.
(1) Coating Film Smoothness
(a) Preparation of Test Plate a A cationic electrodeposition coating material "Power Top U-50" (manufactured by Nippon Paint Automotive Coatings Co., Ltd.) was applied to a dull steel sheet treated with zinc phosphate and having a thickness of 0.8 m, a length of 30 cm, and a width of 40 cm by electrodeposition coating such that a dry film thickness was 20 µm, and then was baked at 160° C. for 30 minutes.

A gray intermediate coating material "Olga OP-30" (polyester-melamine-based coating material manufactured by Nippon Paint Automotive Coatings Co., Ltd.) diluted to have a viscosity of 25 seconds (measured at 20° C. using a No. 4 Ford cup) was applied to the resulting coated sheet in two stages with an air spray such that a dry film thickness was 35 µm, and then was baked at 140° C. for 30 minutes.

An aqueous base coating material was applied to the resulting coated sheet in two stages with a cartridge bell under at a room temperature of 23° C. and a humidity of 68% such that a dry film thickness was 15 m. An interval of 1 minute and 30 seconds was provided between the first application and the second application. After the second application, setting was performed for 1 minute and 30 seconds. Subsequently, preheating was performed at 80° C. for 5 minutes to form an uncured first base coating film.

The aqueous base coating material used was one prepared by subjecting an aqueous coating material manufactured by Nippon Paint Automotive Coatings Co., Ltd. containing "AQUAREX AR-3000 (black)" (trade name) and a black pigment as a coloring pigment to dilution with deionized exchanged water to a viscosity of 6000 mPa·s (measured using a type B viscometer at 20° C. at 6 rpm).

Onto the resulting uncured first base coating film was applied an aqueous metallic base coating material, in two stages with a cartridge bell. An interval of 1 minute and 30 seconds was provided between the first application and the second application. After the second application, setting was performed for 1 minute and 30 seconds. Subsequently, preheating was performed at 80° C. for 5 minutes to form an uncured second base coating film.

As the aqueous metallic base coating material, an aqueous coating composition manufactured by Nippon Paint Automotive Coatings Co., Ltd. containing an aluminum pigment under the trade name of "AQUAREX AR-3000 (metallic)" was used.

Subsequently, the clear coating composition was applied to the resulting coated sheet in one stage such that a dry film thickness was 35 µm, and was set for 7 minutes. Then, baking was performed at 140'C for 30 minutes with a dryer, affording a test plate A having a multilayer coating film.
(b) Measurement and Evaluation of LW Value The Long Wave (LW) value (measurement wavelength: 1,300 to 12,000 µm) of the test plate A was measured using "wave-scan DOT" (manufactured by BYK Gardner), and the smoothness of the resulting coating film was evaluated according to the following criteria. The smaller the LW value, the higher the smoothness of the coating film.
(Evaluation Criteria)
A: The LW value is 10 or less.
C: The LW value is more than 10.
(2) Resistance to Color Shift For a coated test plate A prepared in the same manner as described above, L* values at an acceptance angle of 15 degrees ($L^*_{15}$ value) and an L* value at an acceptance angle of 110 degrees ($L^*_{110}$ value) both at an incident angle of 45 degrees were measured using a multi-angle spectrophotometer MA-6811 (trade name, manufactured by X-Rite, Inc.), and an FF value (=$L^*_{15}$ value/$L^*_{110}$ value) was determined. Using the FF value calculated, evaluation was performed according to the following criteria. The larger the FF value, the better the resistance to color shift.
(Evaluation Criteria)
A: The FF value is 5.5 or more.
B: The FF value is 5.0 or more and less than 5.5.
C: The FF value is less than 5.0.
(3) Pot Life The base agent and the curing agent prepared as described above were mixed with a disper for 1 minute, and the resulting mixture was temperature-controlled to 20° C. The initial viscosity $V_0$ at 20° C. was measured using a Ford Cup No. 4 within 5 minutes from the start of the mixing of the base agent and the curing agent. Subsequently, the mixture was left at rest for 1 hour in a standard state (23° C., humidity: 68%). Thereafter, the mixture was temperature-controlled to 20° C., and the viscosity $V_1$ at 20° C. was measured using a Ford Cup No. 4.

A thickening rate was calculated using the following formula, and evaluation was performed according to the following criteria. The lower the thickening rate, the longer the pot life.

Thickening rate (%)=$100\times(V_1-V_0)/V_0$ (Evaluation Criteria)
A: The thickening rate is less than 25%.
B: The thickening rate is 25% or more and less than 40%.
C: The thickening rate is 40% or more.
(4) Ease of Cleaning A clear coating composition was applied to a glass plate by spray application under the following procedures and conditions, and a scattering coating material (dust) formed during the spray application was attached to the glass plate. Next, according to the following procedure, the scattering coating material attached to the glass plate by dust blowing was wiped off, and the ease of cleaning was evaluated according to the following criteria.
<Air Spray Application Conditions>
Discharge: Return 2 turns from fully closed
Air pressure: 0.25 MPa
<Application Method>
An article to be coated held substantially vertically was subjected to application according to the following procedure.
Step 1. Standing at a position at an angle of 45° and a gun distance of 150 cm from the glass plate, and blowing dust for 10 seconds.
Step 2. Drying at room temperature (23° C.) for 10 seconds.

Step 3. After performing Step 1 and Step 2 five times in total, leaving the specimen at rest at room temperature (23° C.) for 24 hours.

Step 4. After the leaving at rest, wiping off the scattering coating material attached to the glass plate via the above procedure using a waste cloth, and evaluating according to the following criteria.

Evaluation Criteria
A: The scattering coating material can be easily wiped off.
B: The scattering coating material can be wiped off using (a cleaning thinner).
C: The solidification of the scattering coating material on the test plate has progressed, and it is difficult to wipe off the scattering coating material even with the use of (a cleaning thinner).

TABLE 2

|  |  | Example 1 | Example 2 | Example 3 | Example 4 | Example 5 | Example 6 | Example 7 |
|---|---|---|---|---|---|---|---|---|
| Primary hydroxy group-containing acrylic resin (A1) | (A1-1) | 42 | 24 | 12 |  |  | 24 | 24 |
|  | (A1-2) |  |  |  | 24 |  |  |  |
|  | (A1-3) |  |  |  |  | 24 |  |  |
| Secondary hydroxy group-containing acrylic resin (A2) | (A2-1) | 18 | 36 | 48 | 36 | 36 |  |  |
|  | (A2-2) |  |  |  |  |  |  |  |
|  | (A2-3) |  |  |  |  |  | 36 |  |
|  | (A2-4) |  |  |  |  |  |  | 36 |
|  | (A2-5) |  |  |  |  |  |  |  |
| Polyisocyanate compound (B) | (B-1) | 40 | 40 | 40 | 40 | 40 | 40 | 40 |
|  | (B-2) |  |  |  |  |  |  |  |
|  | (B-3) |  |  |  |  |  |  |  |
|  | (B-4) |  |  |  |  |  |  |  |
| Organic solvent (C) | Alcohol solvent (1) |  | 6 | 6 | 6 | 6 | 6 | 6 |
|  | (2) |  |  |  |  |  |  |  |
|  | (3) |  |  |  |  |  |  |  |
|  | (4) |  |  |  |  |  |  |  |
|  | (5) |  |  |  |  |  |  |  |
|  | Solvent other than alcohol solvent  MAK | 30 | 30 | 30 | 30 | 30 | 30 | 30 |
|  | DBE | 7 | 7 | 7 | 7 | 7 | 7 | 7 |
| Equivalent ratio (NCO/OH) of isocyanate groups contained in (B) to hydroxy groups contained in (A) |  | 1.1 | 1.1 | 1.1 | 1.1 | 1.1 | 1.1 | 1.1 |
| Solid concentration at the time of application (% by mass) |  | 60 | 60 | 60 | 60 | 60 | 60 | 60 |
| Evaluation | Coating film smoothness | A | A | A | A | A | A | A |
|  | Resistance to color shift | A | A | A | A | A | A | A |
|  | Pot life | A | A | A | A | A | A | A |
|  | Ease of cleaning | B | B | B | B | B | B | B |

TABLE 3

|  |  | Example 8 | Example 9 | Example 10 | Example 11 | Example 12 | Example 13 | Example 14 |
|---|---|---|---|---|---|---|---|---|
| Primary hydroxy group-containing acrylic resin (A1) | (A1-1) | 24 | 24 | 24 | 24 | 24 | 24 | 23 |
|  | (A1-2) |  |  |  |  |  |  |  |
|  | (A1-3) |  |  |  |  |  |  |  |
| Secondary hydroxy group-containing acrylic resin (A2) | (A2-1) |  | 36 | 36 | 36 | 36 | 36 | 34 |
|  | (A2-2) |  |  |  |  |  |  |  |
|  | (A2-3) |  |  |  |  |  |  |  |
|  | (A2-4) | 36 |  |  |  |  |  |  |
|  | (A2-5) |  |  |  |  |  |  |  |
| Polyisocyanate compound (B) | (B-1) | 40 |  |  |  | 40 | 40 | 43 |
|  | (B-2) |  | 40 |  |  |  |  |  |
|  | (B-3) |  |  | 40 |  |  |  |  |
|  | (B-4) |  |  |  | 40 |  |  |  |
| Organic solvent (C) | Alcohol solvent (1) | 6 | 6 | 6 | 6 | 20 | 10 | 15 |
|  | (2) |  |  |  |  |  |  |  |
|  | (3) |  |  |  |  |  |  |  |
|  | (4) |  |  |  |  |  |  |  |
|  | (5) |  |  |  |  |  |  |  |
|  | Solvent other than alcohol solvent  MAK | 30 | 30 | 30 | 30 | 15 | 15 | 15 |
|  | DBE | 7 | 7 | 7 | 7 | 8 | 18 | 13 |
| Equivalent ratio (NCO/OH) of isocyanate groups contained in (B) to hydroxy groups contained in (A) |  | 1.1 | 1.2 | 1.1 | 1.2 | 1.1 | 1.1 | 1.3 |
| Solid concentration at the time of application (% by mass) |  | 60 | 60 | 60 | 60 | 60 | 60 | 60 |
| Evaluation | Coating film smoothness | A | A | A | A | A | A | A |
|  | Resistance to color shift | A | A | A | A | A | A | A |
|  | Pot life | A | A | A | A | B | B | B |
|  | Ease of cleaning | B | B | B | B | A | A | A |

TABLE 4

|  |  | Example 15 | Example 16 | Example 17 | Example 18 | Comparative Example 1 | Comparative Example 2 | Comparative Example 3 | Comparative Example 4 |
|---|---|---|---|---|---|---|---|---|---|
| Primary hydroxy group-containing acrylic resin (A1) | (A1-1) | 27 | 24 | 24 | 24 | 24 | 60 |  | 24 |
|  | (A1-2) |  |  |  |  |  |  |  |  |
|  | (A1-3) |  |  |  |  |  |  |  |  |
| Secondary hydroxy group-containing acrylic resin (A2) | (A2-1) | 40 | 36 | 36 | 36 | 36 |  | 60 |  |
|  | (A2-2) |  |  |  |  |  |  |  |  |
|  | (A2-3) |  |  |  |  |  |  |  |  |
|  | (A2-4) |  |  |  |  |  |  |  |  |
|  | (A2-5) |  |  |  |  |  |  |  | 36 |
| Polyisocyanate compound (B) | (B-1) | 33 | 40 | 40 | 40 | 40 | 40 | 40 | 40 |
|  | (B-2) |  |  |  |  |  |  |  |  |
|  | (B-3) |  |  |  |  |  |  |  |  |
|  | (B-4) |  |  |  |  |  |  |  |  |
| Organic solvent (C) | Alcohol solvent (1) | 15 |  |  |  |  | 15 | 15 | 15 |
|  | (2) |  | 15 |  |  |  |  |  |  |
|  | (3) |  |  | 15 |  |  |  |  |  |
|  | (4) |  |  |  | 15 |  |  |  |  |
|  | (5) |  |  |  |  | 15 |  |  |  |
|  | Solvent other than alcohol solvent MAK | 15 | 15 | 15 | 15 | 15 | 15 | 15 | 15 |
|  | DBE | 13 | 13 | 13 | 13 | 13 | 13 | 13 | 13 |
| Equivalent ratio (NCO/OH) of isocyanate groups contained in (B) to hydroxy groups contained in (A) |  | 0.9 | 1.1 | 1.1 | 1.1 | 1.1 | 1.1 | 1.1 | 1.1 |
| Solid concentration at the time of application (% by mass) |  | 60 | 60 | 60 | 60 | 60 | 60 | 60 | 60 |
| Evaluation | Coating film smoothness | A | A | A | A | A | A | C | A |
|  | Resistance to color shift | A | A | A | A | A | C | A | C |
|  | Pot life | A | B | B | B | B | B | C | B |
|  | Ease of cleaning | B | A | B | B | C | A | A | A |

All of the clear coating compositions of Examples had good resistance to color shift, and the resulting coating films were good in appearance. Further, the clear coating compositions were good in ease of cleaning even though they were high solid content coating compositions.

Comparative Example 1 is an example in which a tertiary alcohol is included as the alcohol solvent of the organic solvent (C). In this example, the ease of cleaning was not sufficiently satisfactory.

Comparative Example 2 is an example in which the secondary hydroxy group-containing acrylic resin (A2) was not included, and the resistance to color shift of the coating film obtained was not sufficiently satisfactory.

Comparative Example 3 is an example in which the primary hydroxy group-containing acrylic resin (A1) was not included, and the pot life of the coating composition obtained and the appearance (coating film smoothness) of the coating film obtained were not sufficiently satisfactory.

Comparative Example 4 is an example using a resin in which the weight average molecular weight of the secondary hydroxy group-containing acrylic resin (A2) was less than 6000, and the resistance to color shift of the coating film obtained was not sufficiently satisfactory.

The present disclosure includes the following aspects.

[1]
A clear coating composition comprising:
a hydroxy group-containing acrylic resin (A);
a polyisocyanate compound (B); and
an organic solvent (C),
wherein
the hydroxy group-containing acrylic resin (A) includes a primary hydroxy group-containing acrylic resin (A1) and a secondary hydroxy group-containing acrylic resin (A2),
the primary hydroxy group-containing acrylic resin (A1) has a weight average molecular weight of 6000 or less,
the secondary hydroxy group-containing acrylic resin (A2) has a weight average molecular weight of 6000 or more,
the organic solvent (C) includes at least one alcohol solvent selected from the group consisting of linear primary alcohols having 1 to 8 carbon atoms, branched primary alcohols having 3 to 8 carbon atoms, linear secondary alcohols having 1 to 8 carbon atoms, and branched secondary alcohols having 3 to 8 carbon atoms, and
the clear coating composition has a solid concentration at a time of application of 55% by mass or more.

[2]
The clear coating composition according to [1], wherein the primary hydroxy group-containing acrylic resin (A1) has an acid value of 0 mg KOH/g or more and 40 mg KOH/g or less.

[3]
The clear coating composition according to [1] or [2], wherein the secondary hydroxy group-containing acrylic resin (A2) has an acid value of 0 mg KOH/g or more and 40 mg KOH/g or less.

[4]
The clear coating composition according to any one of [1] to [3], wherein a glass transition temperature Tg(A1) of the primary hydroxy group-containing acrylic resin (A1) is −20° C. or higher and 60° C. or lower.

[5]
The clear coating composition according to any one of [1] to [4], wherein a glass transition temperature Tg(A2) of the secondary hydroxy group-containing acrylic resin (A2) is −30° C. or higher and 35° C. or lower.

[6]
The clear coating composition according to any one of [1] to [5], wherein the organic solvent (C) further includes a ketone compound.

[7]
The clear coating composition according to any one of [1] to [6], wherein a mass ratio (A1)/(A2) of a content of the primary hydroxy group-containing acrylic resin (A1) to a content of the secondary hydroxy group-containing acrylic resin (A2) is 1/99 to 80/20.

[8]
The clear coating composition according to any one of [1] to [7], wherein the alcohol solvent is at least one member selected from the group consisting of linear primary alcohols having 3 to 5 carbon atoms and branched primary alcohols having 3 to 5 carbon atoms.

[9]
The clear coating composition according to any one of [1] to [8], wherein the weight average molecular weight of the primary hydroxy group-containing acrylic resin (A1) is 3,000 or more and 6000 or less.

[10]
The clear coating composition according to any one of [1] to [9], wherein the organic solvent (C) further includes at least one organic solvent selected from the group consisting of monocarboxylic acid esters, dibasic ester compounds, cellosolves, and carbitols and having a boiling point of 200° C. or higher.

[11]
A method for producing a coated article, comprising:
applying a base coating composition onto an article to be coated to form an uncured base coating film;
applying a clear coating composition to the uncured base coating film to form an uncured clear coating film; and
simultaneously curing the uncured base coating film and the uncured clear coating film,
wherein
the clear coating composition includes:
    a hydroxy group-containing acrylic resin (A);
    a polyisocyanate compound (B); and
    an organic solvent (C),
the hydroxy group-containing acrylic resin (A) includes a primary hydroxy group-containing acrylic resin (A1) and a secondary hydroxy group-containing acrylic resin (A2),
the primary hydroxy group-containing acrylic resin (A1) has a weight average molecular weight of 6000 or less,
the secondary hydroxy group-containing acrylic resin (A2) has a weight average molecular weight of 6000 or more,
the organic solvent (C) includes at least one alcohol solvent selected from the group consisting of linear primary alcohols having 1 to 8 carbon atoms, branched primary alcohols having 3 to 8 carbon atoms, linear secondary alcohols having 1 to 8 carbon atoms, and branched secondary alcohols having 3 to 8 carbon atoms, and
the clear coating composition has a solid concentration at a time of application of 55% by mass or more.

INDUSTRIAL APPLICABILITY

The clear coating composition of the present invention is a clear coating composition which affords a coating film having superior resistance to color shift and is superior in coating workability while having a high solid content. Therefore, it is suitably used for forming various clear coating Elms, particularly clear coating films for automobiles.

This application claims priority based on Japanese Patent Application No. 2022-206529, which was filed in Japan on Dec. 23, 2022, the disclosure of which application is incorporated herein by reference in its entirety.

The invention claimed is:
1. A clear coating composition comprising:
a hydroxy group-containing acrylic resin (A);
a polyisocyanate compound (B); and
an organic solvent (C),
wherein
the hydroxy group-containing acrylic resin (A) includes a primary hydroxy group-containing acrylic resin (A1) and a secondary hydroxy group-containing acrylic resin (A2),
the primary hydroxy group-containing acrylic resin (A1) has a weight average molecular weight of 6000 or less,
the secondary hydroxy group-containing acrylic resin (A2) has a weight average molecular weight of 6000 or more,
the organic solvent (C) includes at least one alcohol solvent selected from the group consisting of linear primary alcohols having 1 to 8 carbon atoms, branched primary alcohols having 3 to 8 carbon atoms, linear secondary alcohols having 1 to 8 carbon atoms, and branched secondary alcohols having 3 to 8 carbon atoms, and
the clear coating composition has a solid concentration at a time of application of 55% by mass or more.

2. The clear coating composition according to claim 1, wherein the primary hydroxy group-containing acrylic resin (A1) has an acid value of 0 mg KOH/g or more and 40 mg KOH/g or less.

3. The clear coating composition according to claim 1, wherein the secondary hydroxy group-containing acrylic resin (A2) has an acid value of 0 mg KOH/g or more and 40 mg KOH/g or less.

4. The clear coating composition according to claim 1, wherein a glass transition temperature Tg(A1) of the primary hydroxy group-containing acrylic resin (A1) is −20° C. or higher and 60° C. or lower.

5. The clear coating composition according to claim 1, wherein a glass transition temperature Tg(A2) of the secondary hydroxy group-containing acrylic resin (A2) is −30° C. or higher and 35° C. or lower.

6. The clear coating composition according to claim 1, wherein the organic solvent (C) further includes a ketone compound.

7. The clear coating composition according to claim 1, wherein a mass ratio (A1)/(A2) of a content of the primary hydroxy group-containing acrylic resin (A1) to a content of the secondary hydroxy group-containing acrylic resin (A2) is 1/99 to 80/20.

8. The clear coating composition according to claim 1, wherein the clear coating composition contains at least one member selected from the group consisting of linear primary alcohols having 3 to 5 carbon atoms and branched primary alcohols having 3 to 5 carbon atoms as the alcohol solvent.

9. The clear coating composition according to claim 1, wherein the weight average molecular weight of the primary hydroxy group-containing acrylic resin (A1) is 3000 or more and 6000 or less.

10. The clear coating composition according to claim 1, wherein the organic solvent (C) further includes at least one member having a boiling point of 200° C. or higher selected from the group consisting of monocarboxylic acid esters, dibasic ester compounds, cellosolves, and carbitols.

11. A method for producing a coated article, comprising:
applying a base coating composition onto an article to be coated to form an uncured base coating film;

applying a clear coating composition to the uncured base coating film to form an uncured clear coating film; and simultaneously curing the uncured base coating film and the uncured clear coating film, wherein the clear coating composition includes:
- a hydroxy group-containing acrylic resin (A);
- a polyisocyanate compound (B); and
- an organic solvent (C), the hydroxy group-containing acrylic resin (A) includes a primary hydroxy group-containing acrylic resin (A1) and a secondary hydroxy group-containing acrylic resin (A2), the primary hydroxy group-containing acrylic resin (A1) has a weight average molecular weight (Mw) of 6000 or less, the secondary hydroxy group-containing acrylic resin (A2) has a weight average molecular weight (Mw) of 6000 or more, the organic solvent (C) includes at least one alcohol solvent selected from the group consisting of linear primary alcohols having 1 to 6 carbon atoms, branched primary alcohols having 3 to 8 carbon atoms, linear secondary alcohols having 1 to 6 carbon atoms, and branched secondary alcohols having 3 to 8 carbon atoms, and the clear coating composition has a solid concentration at a time of application of 55% by mass or more.

* * * * *